US009158596B2

(12) United States Patent
Dice

(10) Patent No.: US 9,158,596 B2
(45) Date of Patent: Oct. 13, 2015

(54) PARTITIONED TICKET LOCKS WITH SEMI-LOCAL SPINNING

(75) Inventor: David Dice, Foxboro, MA (US)

(73) Assignee: Oracle International Corporation, Redwood City, CA (US)

( * ) Notice: Subject to any disclaimer, the term of this patent is extended or adjusted under 35 U.S.C. 154(b) by 455 days.

(21) Appl. No.: 13/051,877

(22) Filed: Mar. 18, 2011

(65) Prior Publication Data
US 2012/0240126 A1    Sep. 20, 2012

(51) Int. Cl.
*G06F 9/46* (2006.01)
*G06F 9/52* (2006.01)

(52) U.S. Cl.
CPC .......... *G06F 9/526* (2013.01); *G06F 2209/522* (2013.01)

(58) Field of Classification Search
None
See application file for complete search history.

(56) References Cited

U.S. PATENT DOCUMENTS

| 7,594,234 | B1 | 9/2009 | Dice |
|---|---|---|---|
| 2007/0006232 | A1 | 1/2007 | Bliss |
| 2008/0184238 | A1* | 7/2008 | Ruemmler ............... 718/102 |
| 2008/0256073 | A1 | 10/2008 | Detlefs et al. |

OTHER PUBLICATIONS

The Performance of Spin Lock Alternatives for Shared-Memory Multiprocessors. T. E. Anderson, IEEE Transactions on Parallel and Distributed Systems, vol. 1 Issue 1, pp. 6-16, Jan. 1990.
P. S. Magnusson, A. Landin, and E. Hagersten. Queue locks on cache coherent multiprocessors. In Proceedings of the 8th International Symposium on Parallel Processing, pp. 165-171, Washington, DC, USA, 1994. IEEE Computer Society.
V. J. Marathe, M. Moir, and N. Shavit. Composite abortable locks. In Proceedings of the 20th International Symposium on Parallel and Distributed Processing (IPDPS '06), pp. 132-132, Washington, DC, USA, 2006. IEEE Computer Society.
John M. Mellor-Crummey and Michael L. Scott. 1991. Algorithms for scalable synchronization on shared-memory multiprocessors. ACM Transactions on Computing Systems (TOCS 1991), vol. 9, issue 1 (Feb. 1991), pp. 21-65.
"Scalable Synchronization algorithms," http://www.cs.rochester.edu/research/synchronization/pseudocode/ss.html, downloaded Feb. 10, 2011, last updated Sep. 23, 2006, 9 pages.
Michael L. Scott and William N. Scherer. 2001. Scalable queue-based spin locks with timeout. In Proceedings of the eighth ACM SIGPLAN symposium on Principles and practices of parallel programming (PPoPP '01). ACM, New York, NY, USA, pp. 44-52.
David P. Reed and Rajendra K. Kanodia. 1979. Synchronization with eventcounts and sequencers. Commununications of the ACM (CACM), vol. 22, issue 2 (Feb. 1979), pp. 115-123.

* cited by examiner

*Primary Examiner* — Mengyao Zhe
(74) *Attorney, Agent, or Firm* — Robert C. Kowert; Meyertons, Hood, Kivlin, Kowert & Goetzel, P.C.

(57) ABSTRACT

A partitioned ticket lock may control access to a shared resource, and may include a single ticket value field and multiple grant value fields. Each grant value may be the sole occupant of a respective cache line, an event count or sequencer instance, or a sub-lock. The number of grant values may be configurable and/or adaptable during runtime. To acquire the lock, a thread may obtain a value from the ticket value field using a fetch-and-increment type operation, and generate an identifier of a particular grant value field by applying a mathematical or logical function to the obtained ticket value. The thread may be granted the lock when the value of that grant value field matches the obtained ticket value. Releasing the lock may include computing a new ticket value, generating an identifier of another grant value field, and storing the new ticket value in the other grant value field.

20 Claims, 8 Drawing Sheets

PARTITIONED TICKET LOCKS WITH SEMI-LOCAL SPINNING

BACKGROUND

1. Description of the Related Art

Locks, which provide mutual exclusion for access to shared resources and/or execution of critical sections of code, are an important and common structuring mechanism for thread-safe concurrent programming. In a multiprocessor environment with threads and preemptive scheduling, threads can participate in a mutual exclusion protocol through the use of lock or "mutex" constructs. In general, a lock is either in locked or unlocked state and only one thread may hold or own the lock at any one time. For example, a thread that owns a lock may be permitted to enter a critical section protected by the lock. If a second thread attempts to obtain ownership of a lock while a first thread holds the lock, the second thread will not be permitted to proceed into the critical section until the first thread releases the lock and the second thread successfully claims ownership of the lock.

A rich variety of lock implementations may be found in current literature. In general, when a lock is not available, a thread can either spin (e.g., repeatedly polling its value while waiting for it to become available) or de-schedule itself, voluntarily making itself ineligible to be dispatched by the operating system's scheduler. The latter is useful if other threads might be eligible to run. An extremely simple "test-and-set" spin lock implementation will simply loop, attempting to use an atomic instruction to change a memory word from an unlocked state to a locked state. With such a simple spin lock, since all contending threads spin on the same lock variable, this technique is said to use "global spinning". Other more "polite" forms of global spinning, such as "test-and-test-and-set" (TATAS) are possible. While simple, such locks, when contended, generate significant cache coherence traffic and impair the performance of a system by saturating the interconnect from write coherence cache misses. In addition these simple spin locks do not provide FIFO (first-in-first-out) ordering.

A ticket lock is an example of simple global spinning lock. A typical ticket lock consists of two words: a ticket variable and a grant variable. Arriving threads atomically fetch-and-increment the ticket variable and then spin, waiting for grant variable to match the value returned by the fetch-and-increment primitive. At that point the thread is said to own the lock and may safely enter the critical section. Upon exiting the critical section the thread releases the lock by advancing the grant field. This can be accomplished with a simple store operation. Advancing the grant field passes the lock to the next entering thread, if any. Unlike the test-and-set lock, the ticket lock provides FIFO ordering.

To avoid the performance issues inherent in global spinning, it can be useful to employ local spinning, where at most one threads spins on a given variable at any one time. This can reduce cache coherence traffic and coherence hot spots. For example, each thread could spin on a thread-specific variable that is marked when the previous owner releases the lock. However, locks that use local spinning typically require special memory management, e.g., for nodes that are added and removed from a queue, where each node represents a contending thread that is spinning on a field within that node or a node adjacent in the queue. With these locks, when a thread releases a lock it marks the location upon which the next thread to take the lock is spinning, handing off ownership. An array-based queue lock avoids the use of such nodes, but each lock instance must contain an array with one slot for each possible thread that might contend concurrently for that lock. In a system with a large number of logical threads, such an array, when conservatively sized, could prove impractical.

SUMMARY

The systems and methods described herein for implementing and using partitioned ticket locks may in some embodiments provide semi-local spinning and/or strict FIFO ordering, while allowing developers to strike an appropriate balance between memory contention and the space required to implement the partitioned ticket lock. A partitioned ticket lock may control access to a shared resource, such as a shared object or data structure, or a critical section of code that accesses a shared object or data structure. In some embodiments, a partitioned ticket lock may include a single ticket value field and multiple grant value fields. For example, the partitioned ticket lock may include an array of grant fields, or grant value entries. In some embodiments, each of the grant value fields may be the sole occupant (or at least the sole grant value field) of a respective cache line. The number of entries in an array of grant values may be configurable when instantiated (e.g., when the partitioned ticket lock is created) and/or may be dynamically configurable (or re-configurable) during runtime.

In some embodiments, following initiation of the execution of a thread that wishes to access a shared resource, the thread may attempt to acquire a partitioned ticket lock that protects the shared resource. The thread may be one of two or more executing threads that access the shared resource and that may contend for the partitioned ticket lock, at various times. In some embodiments, in attempting to acquire the partitioned ticket lock, the thread may obtain a ticket value from the ticket value field, and may generate an identifier of a particular one of the grant value fields. For example, obtaining the ticket value make include performing a fetch-and-increment type operation to access the ticket value field of the partitioned ticket lock. The generation of the identifier may be dependent on the obtained ticket value. For example, in some embodiments, generating the identifier may include applying a mathematical or logical function to the obtained ticket value, and the function applied to the obtained ticket value may be dependent on the number grant value fields in the partitioned ticket lock. The thread may wait for the value of the identified grant value field to indicate that the thread should be granted the partitioned ticket lock. For example, in some embodiments, the thread may wait for the value of the identified grant value field to be equal to the obtained ticket value.

In some embodiments, in response to determining that the value of the identified grant value field indicates that the thread should be granted the partitioned ticket lock, the partitioned ticket lock may be granted to the thread and the thread may access the shared resource that is protected by the partitioned ticket lock. Once the thread no longer requires exclusive access to the shared resource, it may release the partitioned ticket lock. In some embodiments, releasing the partitioned ticket lock may include computing a new ticket value (e.g., the next ticket value), generating an identifier of another one of the grant value fields, and storing the new ticket value in the other grant value field. Again, generation of the identifier of the other grant value field may be dependent on the new ticket value.

In some embodiments, the number of grant value fields in a partitioned ticket lock (e.g., the number of entries in a grant value array) may be fewer than the maximum number of executing threads that could potentially attempt to access the shared resource. In such embodiments, two or more threads may spin on the same grant value field. For example, while one thread is waiting for the value of a particular one of the grant value fields to be equal to the ticket value it obtained as part of its attempt to acquire the partitioned ticket lock, another thread may be waiting for the value of the same grant value field to be equal to a different ticket value (i.e. the ticket value it obtained as part of an earlier or subsequent attempt to acquire the partitioned ticket lock).

In some embodiments, each of the grant value fields of a partitioned ticket lock may comprise an event count or sequencer instance. In other embodiments, the partitioned ticket lock may be a composite lock that includes multiple sub-locks, and each grant value field may comprise a respective sub-lock. In such embodiments, a thread attempting to acquire the partitioned ticket lock may obtain a ticket value from the ticket value field, generate an identifier of a particular one of the sub-locks, and wait for the identified sub-locks to be in an unlocked state. When the identified one of the sub-locks is determined to be in an unlocked state, the thread waiting for that sub-lock may be granted the partitioned ticket lock.

Figure 1:
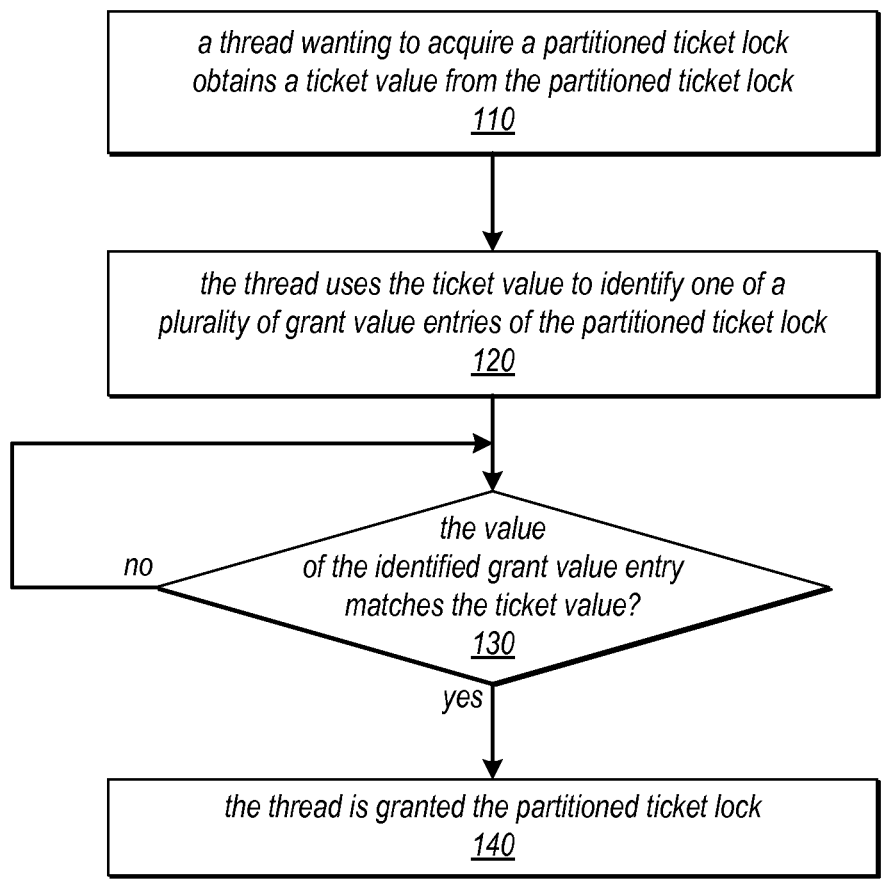
FIG. 1 is a flow diagram illustrating a method for accessing a shared resource or critical section that is protected by a partitioned ticket lock, according to one embodiment.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As noted above, various types of locks may provide mechanisms for accessing shared resources for thread-safe concurrent programming in a multiprocessor environment. For example, locks may be used to protect shared objects or data structures that are accessed by a critical section of code. In some embodiments, the systems and methods described herein for implementing and using a partitioned ticket lock may provide semi-local spinning and strict FIFO ordering, while allowing developers to strike an appropriate balance between memory contention and the space required to implement the partitioned ticket lock.

As described in more detail below, a partitioned ticket lock may in various embodiments include a single ticket field (or "Request" variable) whose value may be referred to herein as its "ticket value", and multiple grant fields (or grant variables). For example, the partitioned ticket lock may include an array comprising multiple "grant value" entries, or "slots". In some embodiments, in order to acquire a partitioned ticket lock, an arriving thread that wishes to enter a critical section of code protected by the lock may atomically fetch and increment the ticket variable, thus obtaining a ticket value. The thread may use the obtained ticket value to identify an index into the array of grant variables, and may spin on the grant variable specified by the index, waiting for its value to match the obtained ticket value. Once the value of the specified grant variable matches the obtained ticket value, the thread may be granted the lock (e.g., it may be granted exclusive access to the critical section as the current holder of the lock). Once the thread has acquired the lock, it may enter the critical section. In some embodiments, to release the lock, the thread may compute the next ticket value (i.e. the next value after the obtained ticket value), may use that next ticket value to identify the index into the grant array associated with that next ticket value, and may store the next ticket value into the grant variable identified by the index associated with the next ticket value. In other embodiments, similar operations may be used to access other types of shared resources that are protected by a partitioned ticket lock.

One embodiment of a method for accessing a shared resource (e.g., a shared object or data structure, or a critical section of code) that is protected by a partitioned ticket lock is illustrated by the flow diagram in FIG. 1. As illustrated at 110 in this example, a thread wanting to acquire the partitioned ticket lock may obtain a ticket value from the partitioned ticket lock. In different embodiments, the thread may obtain the ticket value from the partitioned ticket lock using any of various mechanisms, including, but not limited to, those described herein. The thread may use the obtained ticket value to identify one of a plurality of grant value entries of the partitioned ticket lock, as in 120. For example, various mathematical and/or logical operations may be applied to the obtained ticket value to generate an identifier of one of the grant value entries of the partitioned ticket lock, in different embodiments. Examples of various methods for obtaining a ticket value from a partitioned ticket lock and for using the obtained ticket value to identify a grant value entry are described in more detail below, according to one embodiment.

As described above, once the thread has obtained a ticket value and identified a grant value entry on which to spin/wait, the method may include determining whether the value of the identified grant value entry matches the obtained ticket value, as in 130. If not, shown as the negative exit from 130, the method may include the thread spinning/waiting (e.g., by polling) until the value of the identified grant value entry matches the obtained ticket value, shown as the feedback to 130 from its negative exit. Once the value of the identified grant value entry matches the obtained ticket value, shown as the positive exit from 130, the thread may be granted the partitioned ticket lock, as in 140. For example, the thread may be made the exclusive holder of the lock, thus the thread may be granted exclusive access to the shared resource that the lock protects. The thread may then access the shared resource (e.g., the shared object or data structure, or critical section of code) that is protected by the partitioned ticket lock.

Figure 2:
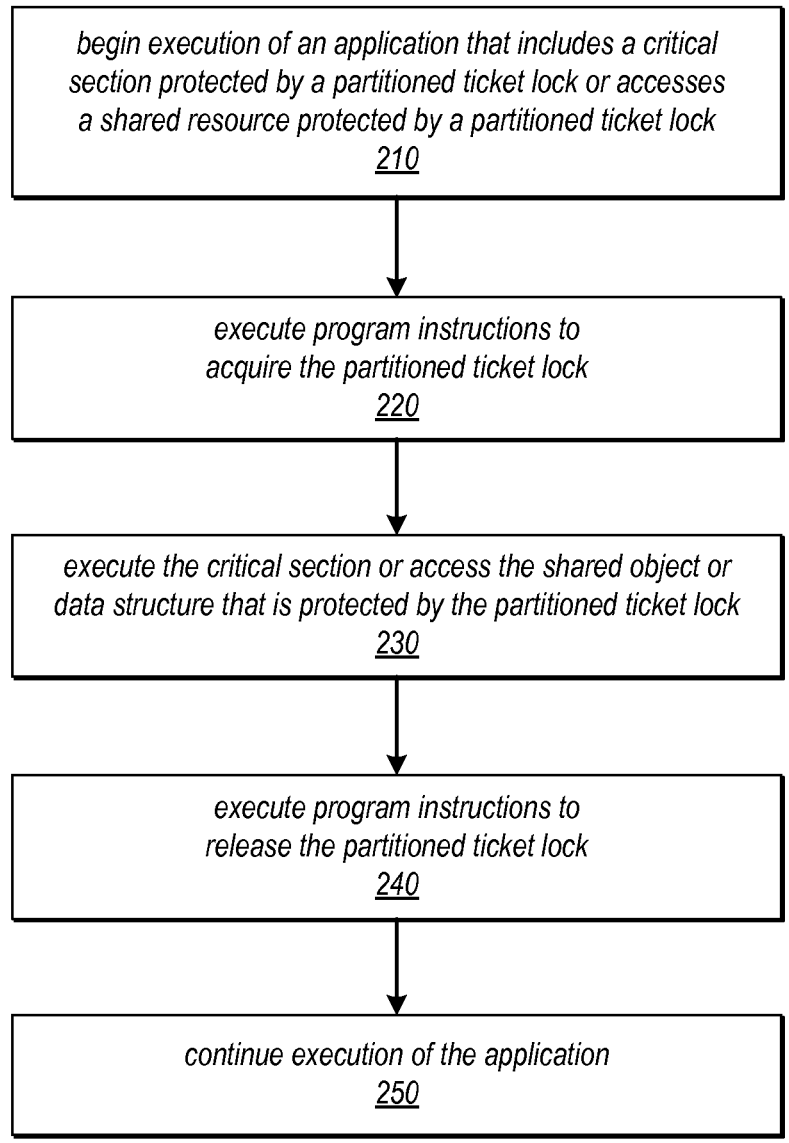
FIG. 2 is a flow diagram illustrating a method for using a partitioned ticket lock to access a shared resource or a critical section, according to one embodiment.

One embodiment of a method for using a partitioned ticket lock to access a shared resource (e.g., a shared object or data structure, or a critical section of code) is illustrated by the flow diagram in FIG. 2. As illustrated in FIG. 2 and described above, the method may include beginning execution of an application (or thread thereof) that includes a critical section protected by a partitioned ticket lock or that accesses a shared resource protected by a partitioned ticket lock, as in 210. The application may include program instructions that are executable to acquire and then release the partitioned ticket lock. As illustrated in FIG. 2, before executing the critical section or accessing the shared resource (as in 230), the method may include executing the program instructions for acquiring the partitioned ticket lock (as in 220). For example, in some embodiments, the application code may call one or more functions or methods that perform one or more of the operations described herein for acquiring a partitioned ticket lock (e.g., obtaining a ticket value, identifying a grant value entry on which to spin, and/or waiting for a match between the value of the identified grant value entry and the obtained ticket value). In some embodiments, such functions or methods may be defined in and/or provided by a support library or other set of utilities.

Once the application (or thread thereof) has been granted the partitioned ticket lock (and, thus, exclusive access to the share resource), it may proceed to access the shared resource that is protected by the partitioned ticket lock (e.g., to execute the critical section, or access the shared object or data structure), as in 230. When the execution of the critical section is completed or exclusive access to the shared resource is no longer required, the method may include executing program instructions to release the partitioned ticket lock. For example, in some embodiments, the application code may call one or more functions or methods that perform one or more of the operations described herein for releasing a partitioned ticket lock (e.g., computing the next ticket value, identifying a grant value entry associated with the next ticket value, and/or storing the next ticket value in the identified grant value entry). Again, such functions or methods may be defined in and/or provided by a support library or other set of utilities. After releasing the partitioned ticket lock (or at least initiating its release), the application (or thread) may continue executing, as in 250. For example, execution of the application may continue past the point at which the shared resource that is protected by the partitioned ticket lock is accessed or the critical section protected by the partitioned ticket lock is executed.

In some embodiments, a system that employs a partitioned ticket lock may provide "semi-local" spinning. In other words, in some embodiments, multiple threads may spin on the same grant field at a given time, but there may be fewer threads spinning on a given grant field than would be the case in systems that employ a typical (naïve) ticket lock that includes only a single shared grant field. In some embodiments, the partitioned ticket lock mechanism described herein may provide strict FIFO ordering.

Note that the partitioned ticket lock described herein may provide a number of advantages over a typical array-based queue lock, which may be considered to be another form of ticket lock. For example, in some embodiments, employing the partitioned ticket lock described herein may reduce the number of writes that are made to shared data (when compared to the typical array-based queue lock), which in turn may reduce cache coherence traffic. In addition (unlike in the typical array-based queue), there is no requirement to pre-allocate at least one grant value entry per thread in the partitioned ticket lock described herein, making the partitioned ticket lock both more flexible and more memory efficient than the typical array-based queue lock. More specifically, for correctness the typical array-based queue lock requires that the array be sized with at least one grant value entry for each thread that might concurrently contend for the lock.

In some embodiments, when employing the partitioned ticket lock described herein, two or more threads may share a grant value entry, which may allow the partitioned ticket lock to include a smaller number of grant value entries (e.g., a smaller fixed size array of grant value entries) than if the number of grant value entries is equal to the maximum number of threads that may potentially attempt to acquire the partitioned ticket lock in order to access a shared resource. This is due, in part, to the fact that the size of the grant value array in the partitioned ticket lock described herein may impact performance, but does not affect correctness. In some embodiments, this characteristic of the partitioned ticket locks described herein may allow a developer that employs a partitioned ticket lock to strike an appropriate balance or trade-off between memory contention and space. For example, employing a partitioned ticket lock that includes a large number of grant values may diffuse contention better than employing one that includes fewer grant values, but a partitioned ticket lock that includes a large number of grant values will, in general, take up more space in the shared memory than one that includes fewer grant values.

The techniques described herein may be further illustrated by the example pseudo code below. In some embodiments, code similar to that illustrated below may be used to create, acquire, and release a partitioned ticket lock.

```
typedef struct {
    int __CacheLinePad [15];    // Pad so that __Grant is sole occupant
                                of a cache line
    volatile int __Grant ; // GrantLine length could be a power-of-two for
                            fast indexing
} GrantLine ;
typedef enum {
    GRANTSLOTS = 4,             // Must be a power-of-two
} ManifestConstants ;
typedef struct {    // Contains a single ticket and multiple grant fields
    volatile int Request ;          // Ticket value
    GrantLine Grants [GRANTSLOTS];  // multiple lanes/stripes to
                                    reduce contention
} TicketLock ;
static TicketLock * TicketLockCreate ( ) {
    TicketLock * const t = (TicketLock *) malloc(sizeof(*t)) ;
    memset (t, 0, sizeof(*t)) ;
    return t ;
}
static int TicketAcquire (TicketLock * L) {
    // First-in-First-enabled doorway protocol
    const int T = FetchIncrement (&L->Request);// Atomic fetch-and-
    increment
    const int cur = T & (GRANTSLOTS-1) ;
    while (L->Grants[cur].__Grant != T) Delay( ) ;
    return T ;
}
static void TicketRelease (TicketLock * L, int T) {
    const int nxt = (T+1) & (GRANTSLOTS-1) ;
    // Advance - increment to hand off the lock to a successor lane/stripe
    L->Grants[nxt].__Grant = T+1 ;
}
// Usage is:
// int t = TicketAcquire(L) ;
// <criticalsection>
// TicketRelease (L, t) ;
```

The example pseudo code above includes three type definitions and three method definitions. In this example, the GrantLine type defines an individual grant field or slot (e.g., in a lane or stripe in shared memory) on which a given thread may spin. When instantiated, each instance of the GrantLine type includes a grant value (called _Grant) that is the sole occupant of an individual cache line (other than some empty padding). The second type defines a GRANTV constant representing the number of stripes or lanes (and corresponding _Grant values) that will be included in a given instance of the partitioned ticket lock. In some embodiments, the value of the GRANTV constant may be constrained to be a power of two, while in other embodiments, the value of the GRANTV constant may not be constrained in this way. The TicketLock type defines a partitioned ticket lock as a collection of a single ticket value (which is called Request, in the example code above), and an array of GrantLine instances (where the number of GrantLane entries/instances included in the array is specified by the GRANTV constant).

In the example pseudo code above, the TicketLockCreate method is a constructor method that may be used to create an instance of a partitioned ticket lock. For example, this method may allocate memory for a partitioned ticket lock and instantiate an instance of the TicketLock type in that allocated memory. The TicketAcquire method illustrated above may be used to acquire a partitioned ticket lock (e.g., by performing operations similar to those illustrated in FIG. 3 and described herein), and the TicketRelease method illustrated above may be used to release a partitioned ticket lock (e.g., by performing operations similar to those illustrated in FIG. 4 and described herein). In this example, the TicketAcquire method returns an integer value equal to the ticket value that was obtained during execution of that method, and this returned value is passed to the TicketRelease method as one of its input parameters. Note that, as illustrated in the example pseudo code above, various partitioned ticket lock implementations may take advantage of built-in (i.e. native) fetch-and-increment (or fetch-and-add) type instructions, if available, thus affording a "wait-free" lock gateway protocol. Note also that, as shown in this example, the partitioned ticket lock may dictate a pure FIFO ordering imposed by linearization on the fetch-and-increment operation to the Request field.

Note that instead of passing the ticket value from TicketAcquire( ) to TicketRelease( ), as in the example code and other descriptions above, in some embodiments, the ticket value may be safely saved into a dedicated field in the partitioned ticket lock structure after the lock has been acquired. This is because the mutual exclusion property of the partitioned ticket lock would protect such a dedicated field. In such embodiments, this saved ticket value could be fetched and/or reloaded at release time (e.g. for use as a parameter of the TicketRelease method).

Figure 3:
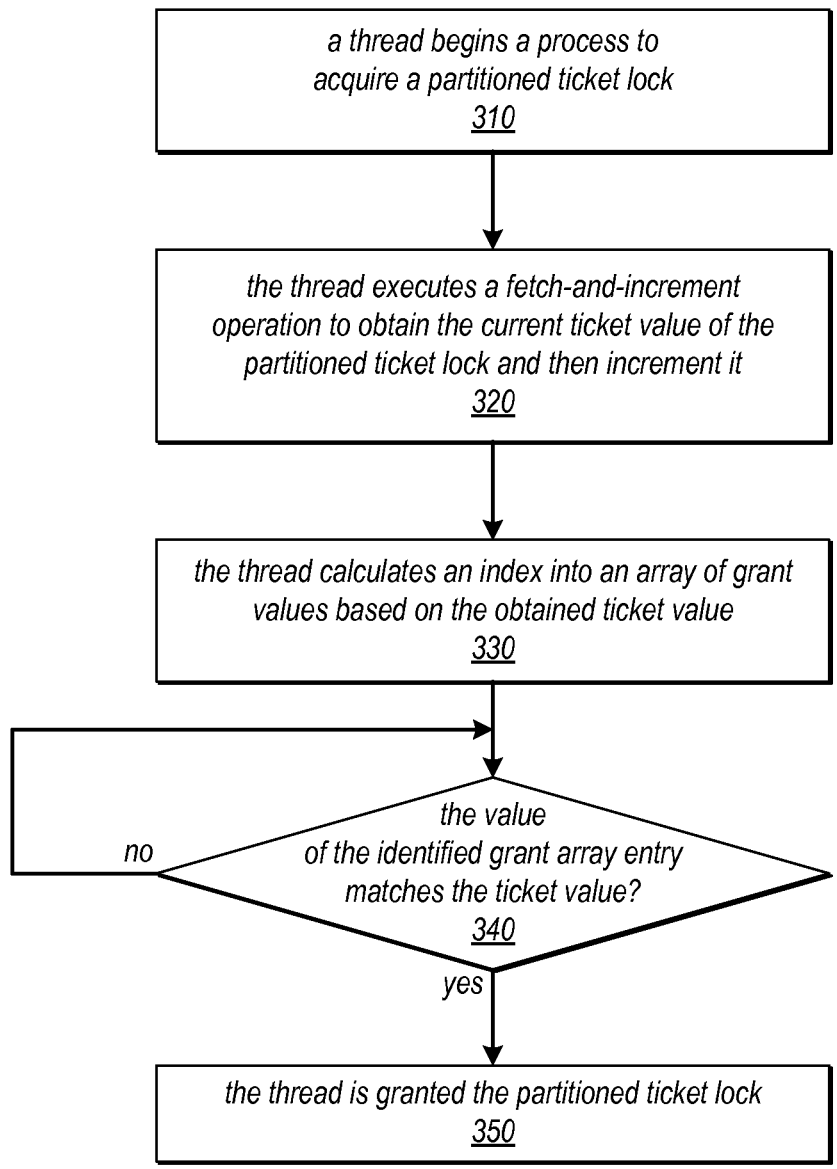
FIG. 3 is a flow diagram illustrating a method for acquiring a partitioned ticket lock, according to one embodiment.
Figure 4:
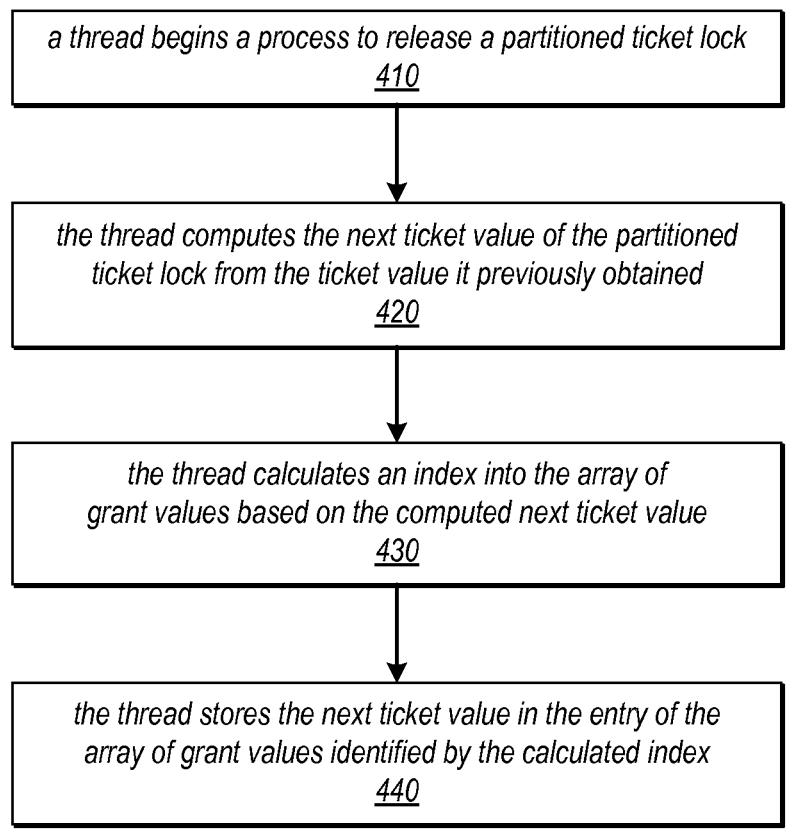
FIG. 4 is a flow diagram illustrating a method for releasing a partitioned ticket lock, according to one embodiment.

The techniques described herein for acquiring and releasing a partitioned ticket lock may be further illustrated by the detailed flow diagrams in FIGS. 3 and 4. For example, one embodiment of a method for acquiring a partitioned ticket lock is illustrated by the flow diagram in FIG. 3. In this example, a given thread may begin a process for acquiring a partitioned ticket lock, as in 310. For example, the thread may call a function or method such as the TicketAcquire function described above to initiate the acquisition of a partitioned ticket lock on behalf of an application. In some embodiments, such a function or method may be defined in and/or provided by a support library or other set of utilities. As illustrated at 320 and described herein, in some embodiments, the thread may execute a fetch-and-increment type operation to obtain the current ticket value of the partitioned ticket lock and then increment it. For example, in various embodiments, a fetch-and-increment type operation may be provided as a library function or as a built-in instruction of a processor (i.e. as an instruction in the processor's native instruction set). This fetch-and-increment operation may return the current ticket value to the thread that initiated the lock acquisition process, and may increment the ticket value for use in a subsequent attempt to acquire the partitioned ticket lock (i.e., an attempt initiated by the same thread or another thread). In some embodiments, the incremented ticket value may be stored in the partitioned ticket lock as the new ticket value following the execution of the fetch-and-increment operation.

As illustrated at 330, the thread may calculate an index into an array of grant values based on the obtained ticket value. For example, in some embodiments, the thread may apply a mapping function to the obtained ticket value to generate a value that identifies a particular stripe or lane that is mapped to an individual grant value entry (or slot) of the partitioned ticket lock, and to which the acquisition request is directed. The mapping function may apply a mask (e.g., a bit-wise operation, as in the example pseudo code above), a modulus operation, or any combination of logical or mathematical operations that serves to map each ticket acquisition request to a respective grant value array entry, dependent on the obtained ticket value. In some embodiments, each of a plurality of grant value entries in the array may be the sole occupant of a respective cache line (other than any empty padding). In such embodiments, each grant value entry may be local to a respective thread. For example, in the example code above, each instance of the GrantLine structure includes an integer (_Grant) representing a single grant field (or a single grant value array entry), plus a padding of fifteen additional integers. Therefore, in this example, each instance of the GrantLine structure fills up one cache line.

In the example code above, by constraining the number of grant fields (or grant value array entries) to be a power of two, a simple masking function may be used to generate an index (shown as cur, in the example code above) into the grant value array to identify the entry (or GrantLine) that contains the particular grant field (_Grant) on which to spin, and this grant field may be local to the thread that is attempting to acquire the lock. For example, if the ticket value (T) obtained by the FetchIncrement operation in the example code above were 7, and the GRANTSLOTS value were 4, a bit-wise AND operation would be applied to this T value (7) and GRANTSLOTS-1 (3) to calculate a value of the index (cur) into the grant value array Grant of 3. Therefore, in this example, the thread would spin on Grant[3] until the value of its _Grant field was 7.

If the value of the identified grant array entry does not match the obtained ticket value, shown as the negative exit from 340, the thread may spin on the grant value array entry (e.g., polling a thread-local variable or cache entry, and waiting for its value to match the obtained ticket value), shown as the feedback to 340 from its negative exit. Once the identified grant array entry matches the obtained ticket value, shown as the positive exit from 340, the thread may be granted the partitioned ticket lock, as in 350. Note that in some embodiments, if the thread has not been granted the partitioned ticket lock before a pre-determined timeout period expires, an error or exception condition may be generated (not shown). In some embodiments, an error or exception condition generated by another process or thread may cause an attempt to acquire the partitioned ticket lock by a given thread to be interrupted or aborted (not shown).

One embodiment of a method for releasing a partitioned ticket lock is illustrated by the flow diagram in FIG. 4. In this example, a thread that holds a partitioned ticket lock (and that no longer requires the lock) begins a process to release the lock, as in 410. For example, the thread may call a function or method such as the TicketRelease function described above to initiate the release of a partitioned ticket lock on behalf of an application. In some embodiments, such a function or method may be defined in and/or provided by a support library or other set of utilities. As illustrated at 420 and described herein, in some embodiments, the thread may compute the next ticket value of the partitioned ticket lock from the ticket value it previously obtained. In some embodiments, computing the next ticket value may involve incrementing the previously obtained ticket value, while in other embodiments, one or more other mathematical or logical operations may be applied to the obtained ticket value to compute the next ticket value.

As illustrated at 430, the thread may calculate an index into an array of grant values based on the computed next ticket value. For example, in some embodiments, the thread may apply a mapping function to the next ticket value to generate a value that identifies a particular stripe or lane that is mapped to an individual grant value entry (or slot) of the partitioned ticket lock. The mapping function may apply a mask (e.g., a bit-wise operation, as in the example pseudo code above), a modulus operation, or any combination of logical or mathematical operations to the next ticket value that serves to map the next ticket value to a respective grant value array entry. The thread may then store the next ticket value in the grant value array entry identified by the calculated index, as in 440. As noted above, each of a plurality of grant value entries in the array may be the sole occupant of a respective cache line, and may be local to a respective thread. For example, in the example code above, each instance of the GrantLine structure includes an integer (_Grant) representing a single grant field (or a single grant value array entry), plus a padding of fifteen additional integers. Therefore, in this example, each instance of the GrantLine structure fills up one cache line. In addition, by constraining the number of grant fields (or grant value array entries) to be a power of two, a simple masking function may be used to generate the next index (shown as nxt, in the example code above) into the grant value array to identify the next entry (or GrantLine) that contains the particular grant field (_Grant) in which to store the next ticket value, and this next grant field may be local to the next thread that attempts to acquire the lock.

In some embodiments, by computing the next ticket value and storing it in a grant value array entry other than the one on which the thread spun to acquire the partitioned ticket lock (e.g., the next entry in the array, or an entry mapped to the next stripe or lane to which lock acquisition requests are directed), the partitioned ticket lock release process illustrated in FIG. 4 may effectively pass the partitioned ticket lock to another thread that is spinning on that other grant value entry (e.g., based on a ticket value obtained by that other thread).

As previously noted, by minimizing stores to shared central variables (or more precisely, the cache lines underlying such variables) and loads from shared central variables that are frequently written by multiple threads, the techniques described herein may reduce cache coherence traffic. For example, because the partitioned ticket locks described herein include multiple grant fields, employing such a partitioned ticket lock (rather than a typical ticket lock that includes a single, central grant field) may reduce the number of stores that to any single grant field (or its underlying cache line) and the number of loads from a single grant field (e.g., while spinning).

As previously noted, the choice of the number of grant fields (e.g., as specified by the value of the GRANTSLOTS parameter in the example code above) may be somewhat arbitrary, and may be used to trade-off or balance memory contention vs. space. For example, larger values of the GRANTSLOTS parameter may further diffuse contention, and they may be more suitable for systems that include a larger numbers of processors and that exhibit contention for the lock in question. Choosing a larger value for the GRANTSLOTS parameter, however, may mean that in the uncontended case with repetitive locking of the same lock (which may be a common situation), the lock will have to cycle through more grant value array entries, which may increase data cache pressure. In some embodiments, the number of grant value entries (e.g., the value of the GRANTSLOTS parameter, in the code example above) may be adaptive (e.g., at runtime), and may be dynamically modified based on the amount of contention and/or the distribution of the attempts to acquire the lock across the concurrently executing threads.

Figure 5:
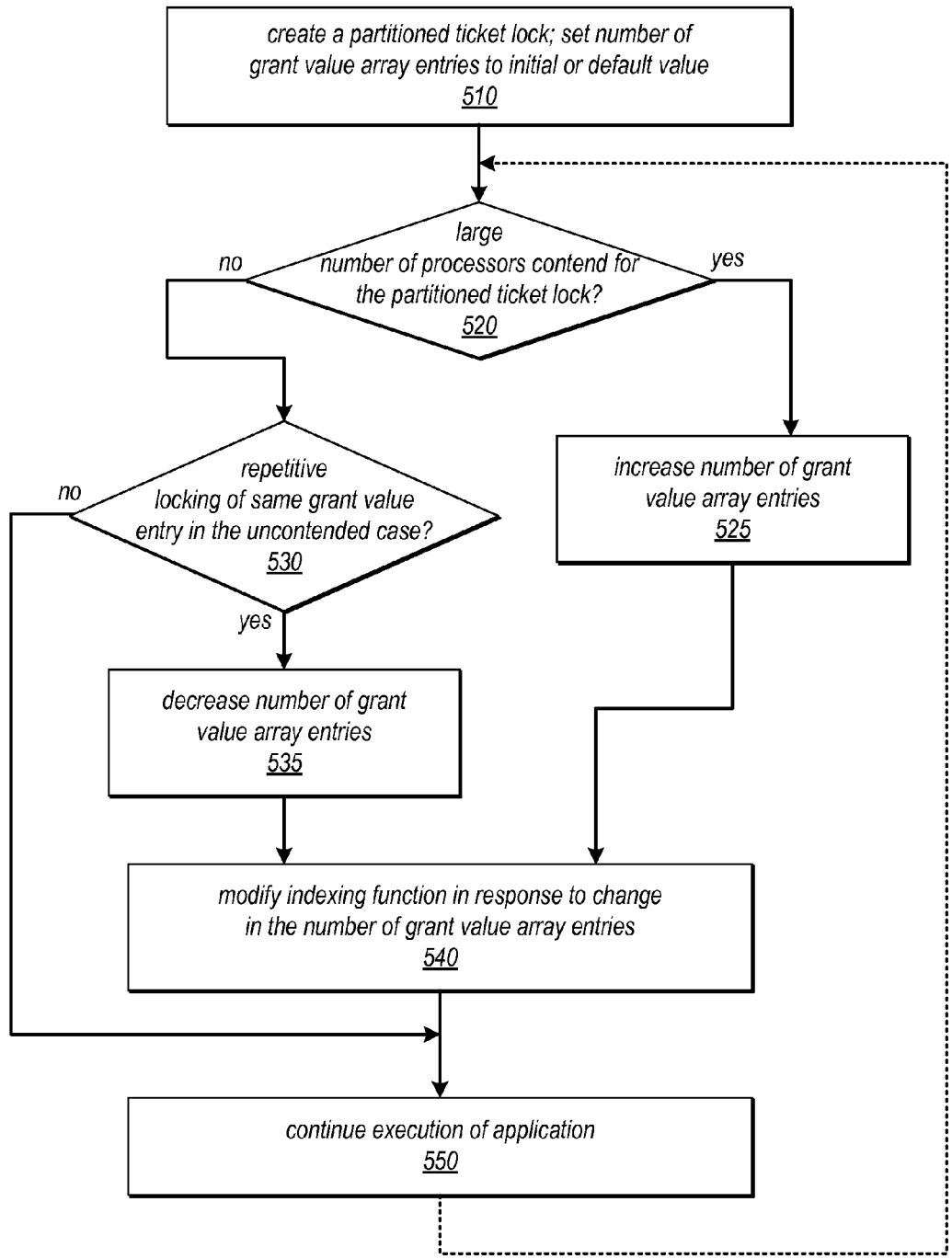
FIG. 5 is a flow diagram illustrating a method for dynamically adjusting the number of grant value array entries in a partitioned ticket lock, according to one embodiment.

One embodiment of a method for adapting the number of grant values associated with a partitioned ticket lock is illustrated by the flow diagram in FIG. 5. In this example, the method may include creating a partitioned ticket lock and setting the number of grant values (e.g., the number of entries in a grant value array) to an initial or default value, as in 510. For example, in some embodiments, the application code may call one or more functions or methods (e.g., functions or methods defined in a support library or other set of utilities) that perform various operations to create a partitioned ticket lock (such as the TicketLockCreate constructor method illustrated in the example code above). In other embodiments, an operating system or other system software may be configured to create the partitioned ticket lock for the use of an application. In some embodiments, a default value for the number of grant values associated with a partitioned ticket lock may be on the order of (and/or related to) the number of processors in the system. For example, in a system with 16 processors, the default value may be 4, 8, or 16 grant values, in different embodiments. In some embodiments, the value may be constrained to a power of two (e.g., to simplify various calculations and/or mapping functions, as in the example code described above). In some embodiments, an initial or default value for the number of grant values associated with a partitioned ticket lock may be based on historical data about the performance, load (e.g., the number and distribution of thread accesses to the shared resource or critical section protected by the partitioned ticket lock) or other characteristics of the system and/or application that employs the partitioned ticket lock.

In some embodiments, after a partitioned ticket lock has been created, the application or other system software that created the partitioned ticket lock (e.g., the operation system or a module thereof) may monitor the performance of the system and/or the load on the partitioned ticket lock (i.e. the amount of contention for the lock and/or the distribution of lock acquisition requests across various processors or threads contending for the lock). In some embodiments, if a large number of processors are contending for the partitioned ticket lock, shown as the positive exit from 520, the method may include increasing the number of grant values associated with the partitioned ticket lock, as in 525. For example, in various embodiments, the application may dynamically allocate more entries in a grant value array of the partitioned ticket lock or may create a new partitioned ticket lock that includes more grant value array entries to replace the originally created partitioned ticket lock.

In some embodiments, if it is determined that there is repetitive locking of the same grant value entry in the uncontended case, shown as the positive exit from 530, the method may include decreasing the number of grant values associated with the partitioned ticket lock, as in 535. For example, in various embodiments, the application may dynamically de-allocate entries in a grant value array of the partitioned ticket lock or may create a new partitioned ticket lock that includes fewer grant value array entries to replace the originally created partitioned ticket lock.

As illustrated at 540 in this example, if the number of grant values associated with a partitioned ticket lock changes during execution (e.g., if the number of grant values is increased or decreased), the method for adapting the number of grant values associated with a partitioned ticket lock may include modifying the indexing function that maps ticket values to grant value entries in response to that change. For example, if the number of grant values increases, the method may include modifying the indexing function such that it distributes thread acquisition requests across a larger number of grant value entries (which may, in turn, result in less contention for each of the grant value entries). On the other hand, if the number of grant values decreases, the method may include modifying the indexing function such that it distributes thread acquisition requests across the resulting smaller set of grant value entries.

In this example, once the number of grant value entries has been modified (or after determining that it does not need to be modified, shown as the negative exit from 530), execution of the application may continue, as in 550. Note that in some embodiments, the application or other system software (e.g., the operation system or a module thereof) may be configured to continuously, repeatedly, and/or periodically monitor system performance and/or contention for the partitioned ticket lock, and may dynamically adjust the number of grant value entries when doing so is likely to improve performance and/or reduce contention. In such embodiments, the operations shown as 520-550 in FIG. 5 may be repeated any number of times. This feedback loop is illustrated in FIG. 5 by the dashed line from 550 to 520. In other embodiments, the initiation of an adaptive process for evaluating the effectiveness of the current number of grant value entries and/or modifying the number of grant value entries may be triggered in response to the detection of various system conditions, e.g., a change in hardware, work load, or contention on one or more grant value entries.

Note that in some embodiments, instead of performing simple spinning on each grant field of a partitioned ticket lock, each grant field (or slot) could include an event count or sequencer instance. In such embodiments, arriving threads in the lock acquisition path may first atomically fetch and increment the ticket value field of the partitioned ticket lock to obtain a linearization number, and then invoke an "await( )" operation on the event count in the slot associated with that ticket value (or linearization number). In such embodiments, to release the lock, a thread may invoke an "advance( )" operation on the next slot, i.e. the slot associated with the next ticket value (or linearization number) following the ticket value (linearization number) that it previously obtained.

In some embodiments, the techniques described herein may be employed by a partitioned ticket lock that is implemented as a composite contention-diffusing lock. In such embodiments, the partitioned ticket lock may be implemented using a single ticket value and an array of sub-locks. In such embodiments, each of the sub-lock instances may be traditional locks, such as spin locks, but they must tolerate asymmetric imbalanced usage, such as when one thread acquires such a sub-lock while another thread subsequently releases that same sub-lock. In some embodiments, this approach may allow a developer to compose a contention-reducing partitioned ticket lock from standard simple lock types.

The techniques described above may be further illustrated by the example pseudo code below. In some embodiments, code similar to that illustrated below may be used to create, acquire, and release a partitioned ticket lock that is implemented using an array of sub-locks.

```
typedef struct {
    int _pad [15] ;      // Pad so that _Lock is sole occupant
                         of the cache line
    volatile int _Lock ; // Sub-Lock instance
} SubLock ;
typedef enum {
    NumberSubLocks = 4,  // Must be a power-of-two
} ManifestConstants ;
typedef struct {
    volatile int Ticket ;
    volatile int CurrentHolder ;
    SubLock SubLocks [NumberSubLocks] ;
} CompositeLock ;
static CompositeLock * LockCreate ( ) {
    CompositeLock * const t = (CompositeLock *) malloc(sizeof(*t)) ;
    memset (t, 0, sizeof(*t)) ;
    // First sublock is unlocked, others initialized locked
    // locked state is represented by _Lock != 0.
    // For mutual exclusion ensure that just one sublock -- the
    // instance referenced by the Ticket index -- is initially unlocked.
    // K-Exclusion is implemented by initializing the array
    // with a run of K sub-locks having _Lock=0 .
    for (int i = 0 ; i < NumberSubLocks ; i++) {
        t->SubLocks[i]._Lock = 1 ;
    }
    t->SubLocks[0]._Lock = 0 ;
    return t ;
}
static void CompositeAcquire (CompositeLock * L) {
    // Requires 2 atomic operations in uncontended fast-path
    // Provides mostly FIFO lock order discipline
    const int T = FetchIncrement (&L->Ticket);   // Atomic fetch-and-
                                                    increment
    const int cur = T & (GRANTSLOTS−1) ;
    // Acquire the underyling sub-lock, e.g., a test-and-test-and-set
    (TATAS) lock
    for (;;) {
        while (L->SubLocks[cur]._Lock != 0) Delay( ) ;
    }
    L->CurrentHolder = T ;
}
static void CompositeRelease (CompositeLock * L) {
    //  Determine next sub-lock instance
    const int nxt = (L->CurrentHolder+1) & (GRANTSLOTS−1) ;
    // Unlock that sub-lock
    assert (L->SubLocks[nxt]._Lock != 0) ;
    L->SubLocks[nxt]._Lock = 0 ;
}
// Usage is:
//    CompositeAcquire(L) ;
//    <criticalsection>
//    CompositeRelease (L, t) ;
```

The example pseudo code above includes three type definitions and three method definitions. In this example, the SubLock type defines an individual sub-lock (e.g., in a lane or stripe in shared memory) on which a given thread may spin. When instantiated, each instance of this SubLock type includes a simple spin lock (called _Lock) that is the sole occupant of an individual cache line. The second type defines a NumberSubLocks constant representing the number of stripes or lanes (and corresponding sub-lock instances) that will be included in a given instance of the composite ticket lock. In some embodiments, the value of the NumberSubLocks constant may be constrained to be a power of two, while in other embodiments, the value of the NumberSubLocks constant may not be constrained in this way. The CompositeLock type defines a partitioned ticket lock that is implemented as a collection of elements, including a single ticket value (which is called Ticket, in the example code above), a single value representing the ticket value that was obtained by the current holder of the lock (called CurrentHolder), and an array of sub-lock instances (where the number of sub-lock entries/instances included in the array is specified by the NumberSubLocks constant).

In the example pseudo code above, the LockCreate method is a constructor method that may be used to create an instance of a partitioned ticket lock that is implemented as a composite ticket lock comprising multiple sub-locks. For example, this method may be used to allocate memory for a composite ticket lock and instantiate an instance of the CompositeLock type in that allocated memory. The CompositeAcquire method illustrated above may be used to acquire a composite ticket lock (e.g., by performing operations similar to those illustrated as 620-650 in FIG. 6 and described below), and the CompositeRelease method illustrated above may be used to release a composite ticket lock (e.g., by performing operations similar to those illustrated as 660-680 in FIG. 6 and described below). Note that, as illustrated in the example pseudo code above, various composite ticket lock implementations may take advantage of built-in (i.e. native) fetch-and-increment (or fetch-and-add) type instructions, if available, thus affording a "wait-free" lock gateway protocol. Note also that the composite ticket lock described herein may dictate a "mostly FIFO" ordering due to linearization on the fetch-and-increment operation to the Ticket field. However, in the composite ticket lock described herein, strict FIFO ordering may not be guaranteed. In some embodiments, the composite ticket lock described herein may not grant the lock to various contending threads in a manner that is as fair as that employed by the partitioned ticket lock described earlier, but this characteristic may be useful (or even desirable) under certain conditions. For example, in some cases, better locality may be achieved if one thread (or a small number of threads) is allowed to dominate for some period of time (e.g., if some threads are able to acquire the lock more often than other threads).

Figure 6:
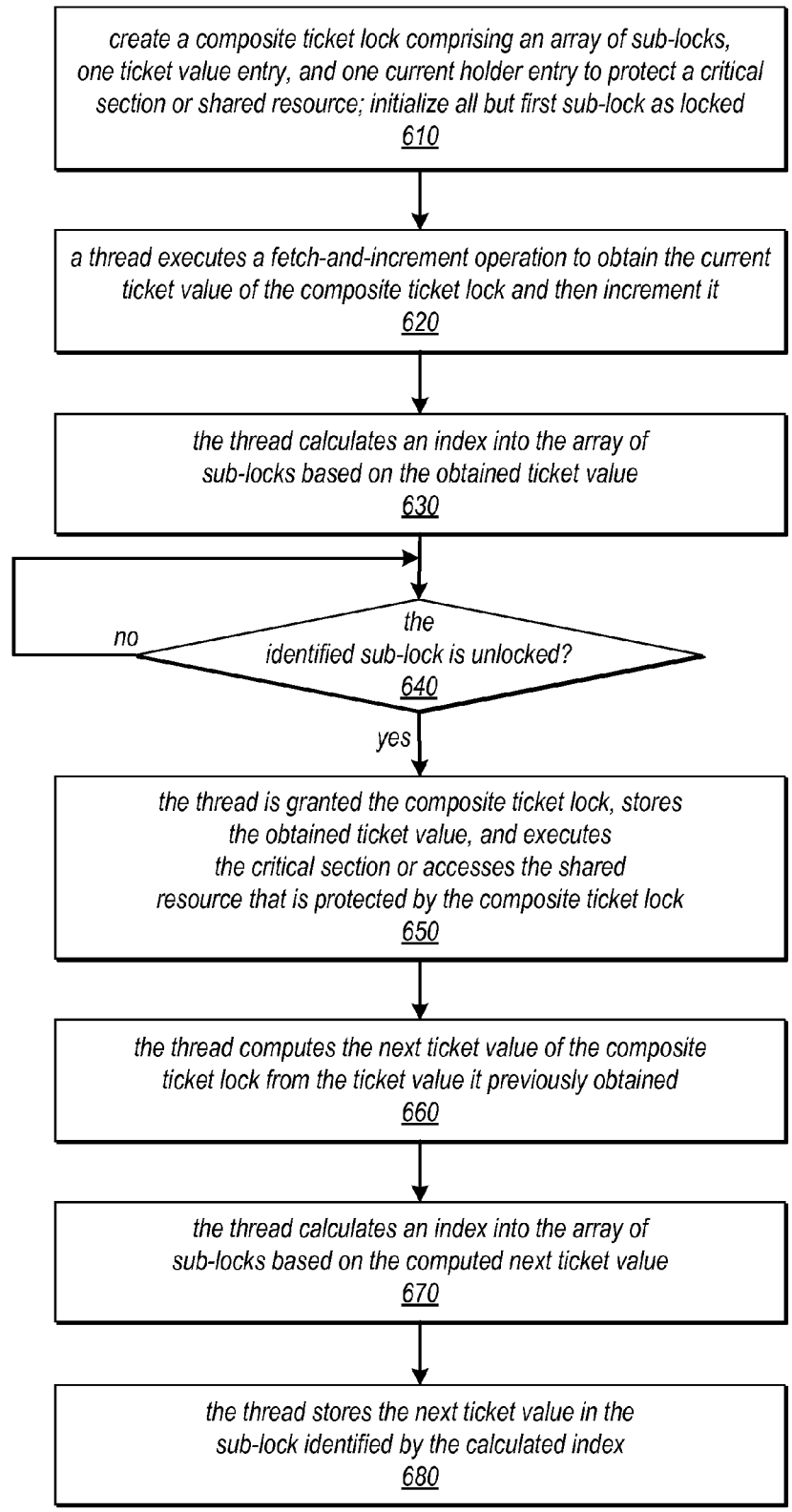
FIG. 6 is a flow diagram illustrating a method for creating and using a partitioned ticket lock composed of multiple sub-locks to access a shared resource or a critical section, according to one embodiment.

One embodiment of a method for using a partitioned ticket lock composed of multiple sub-locks to protect a critical section of code or a shared resource is illustrated by the flow diagram in FIG. 6. In this example, the method may include creating a composite ticket lock comprising an array of sub-locks, one ticket value entry, and one current holder entry to protect the critical section of code or the shared resource, as in 610. For example, in some embodiments, the application code may call one or more functions or methods (e.g., functions or methods defined in a support library or other set of utilities) that perform various operations to create such a composite ticket lock (such as the LockCreate constructor method illustrated in the example code above). In other embodiments, an operating system or other system software may be configured to create the composite ticket lock for the use of an application. As illustrated in FIG. 6, in some embodiments, all of sub-locks except for the first sub-lock in the array may be initialized in a "locked" state.

In this example, a given thread may begin a process for acquiring the composite ticket lock. For example, the thread may call a function or method such as the CompositeAcquire function described above to initiate the acquisition of a composite ticket lock on behalf of an application. In some embodiments, such a function or method may be defined in and/or provided by a support library or other set of utilities. As illustrated at 620 and described herein, in some embodiments, the thread may execute a fetch-and-increment type operation to obtain the current ticket value of the composite ticket lock and then increment it. For example, in various embodiments, a fetch-and-increment type operation may be provided as a library function or as a built-in instruction of a processor (i.e. as an instruction in the processor's native instruction set). This fetch-and-increment operation may return the current ticket value to the thread that initiated the lock acquisition process, and may increment the ticket value for use in a subsequent attempt to acquire the composite ticket lock (i.e., an attempt initiated by the same thread or another thread). In some embodiments, the incremented ticket value may be stored in the composite ticket lock as the new ticket value following the execution of the fetch-and-increment operation.

As illustrated at 630, the thread may calculate an index into the array of sub-locks based on the obtained ticket value. For example, in some embodiments, the thread may apply a mapping function to the obtained ticket value to generate a value that identifies a particular stripe or lane that is mapped to an individual sub-lock of the composite ticket lock, and to which the acquisition request is directed. The mapping function may apply a mask (e.g., a bit-wise operation, as in the example pseudo code above), a modulus operation, or any combination of logical or mathematical operations that serves to map each ticket acquisition request to a respective sub-lock, dependent on the obtained ticket value. In some embodiments, each of a plurality of sub-lock instances in the array may be the sole occupant of a respective cache line (other than any padding). In such embodiments, each sub-lock may be local to a respective thread.

If the identified sub-lock is locked, shown as the negative exit from 640, the thread may spin on the sub-lock (e.g., polling a thread-local variable or cache entry, and waiting for its value to indicate that the sub-lock is unlocked), shown as the feedback to 640 from its negative exit. Once the identified sub-lock is unlocked, shown as the positive exit from 640, the thread may be granted the composite ticket lock, as in 650. In some embodiments, when the thread is granted the composite ticket lock, the ticket value that was obtained by the thread may be stored in the lock (e.g., in a CurrentHolder field, as in the example code above). Note that in some embodiments, if the thread has not been granted the composite ticket lock before a pre-determined timeout period expires, an error or exception condition may be generated (not shown). In some embodiments, an error or exception condition generated by another process or thread may cause an attempt to acquire the composite ticket lock by a given thread to be interrupted or aborted (not shown). As illustrated in FIG. 6, once the thread has been granted the composite lock, the thread may execute the critical section or access the shared resource that is protected by the composite ticket lock.

In this example, when the thread that holds the composite ticket lock no longer requires the lock, it may initiate a process to release the lock. For example, the thread may call a function or method such as the CompositeRelease function described in the example code above to initiate the release of a composite ticket lock on behalf of an application. In some embodiments, such a function or method may be defined in and/or provided by a support library or other set of utilities. As illustrated at 660 and described herein, in some embodiments, the thread may compute the next ticket value of the composite ticket lock from the ticket value it previously obtained (e.g., the value stored in the CurrentHolder field of the composite ticket lock, as in the example code above). In some embodiments, computing the next ticket value may involve incrementing the previously obtained ticket value, while in other embodiments, one or more other mathematical or logical operations may be applied to the obtained ticket value to compute the next ticket value.

As illustrated at 670, the thread may calculate an index into the array of sub-locks based on the computed next ticket value. For example, in some embodiments, the thread may apply a mapping function to the next ticket value to generate a value that identifies a particular stripe or lane that is mapped to an individual sub-lock of the composite ticket lock. The mapping function may apply a mask (e.g., a bit-wise operation, as in the example pseudo code above), a modulus operation, or any combination of logical or mathematical operations to the next ticket value that serves to map the next ticket value to a respective sub-lock. As noted above, each of a plurality of sub-lock instances in the array may be the sole occupant of a respective cache line, and/or may be local to a respective thread.

As illustrated in this example, the thread may store the next ticket value in the sub-lock identified by the calculated index, as in 680. In some embodiments, by computing the next ticket value and storing it in a sub-lock other than the one on which the thread spun to acquire the composite ticket lock (e.g., the next sub-lock in the array, or a sub-lock mapped to the next stripe or lane to which lock acquisition requests are directed), the composite ticket lock release process illustrated in FIG. 6 may effectively pass the composite ticket lock to another thread that is spinning on that other sub-lock (e.g., based on a ticket value obtained by that other thread).

Figure 7:
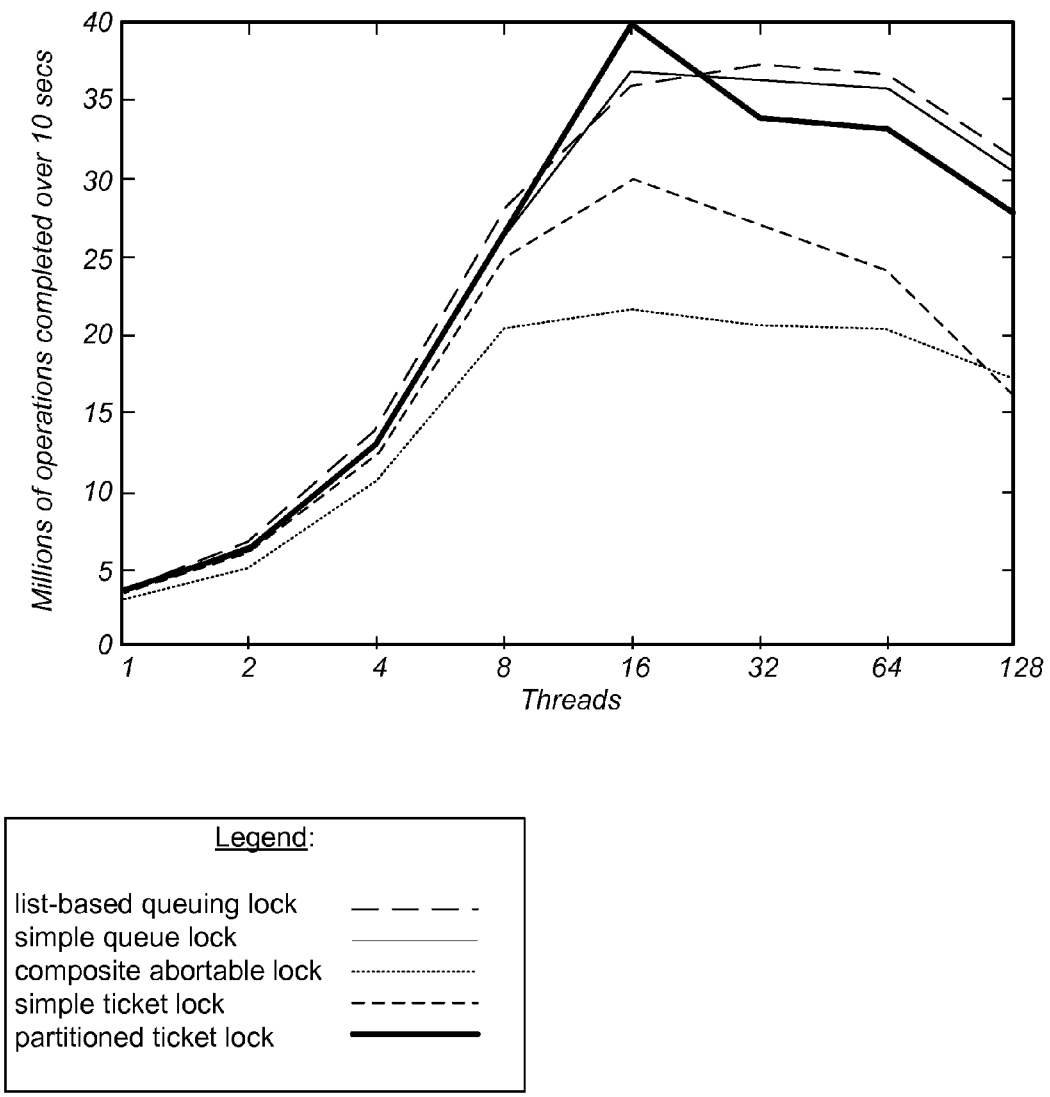
FIG. 7 is a graph illustrating the performance of different types of locks, according to various embodiments.

Performance testing has shown that in various embodiments (and for a wide range of applications), the partitioned ticket locks described herein may be significantly superior to simple ticket locks, composite abortable locks, list-based queuing locks, and simple queue locks, yielding the best throughput over a highly contended lock, while overcoming the disadvantages of these other types of locks (including some that are described herein). For example, FIG. 7 is a graph illustrating the performance of different types of locks when employed in a micro-benchmark that iterates for 10 seconds. In this example, each iteration acquires a lock, looks up a value in a small red-black tree of 10 elements, releases the lock, and then executes the non-critical section (which has approximately 10 times the path length of the uncontended critical section). Only one lock and red-black tree are used. There are no writes in the critical section. Results are reported in the graph in terms of millions of iterations completed by all the threads collectively during the 10-second measurement interval, with the number of threads varying from 1 to 128. The data illustrated in FIG. 7 was collected on a 128-way 2-socket Sun T5240 system populated with UltraSPARC-T2™ "Niagara" processors and running the Solaris™ operating system. The graph illustrates the performance of a simple ticket lock, a composite abortable lock configured with 16 internal nodes, a list-based queuing lock, a simple queue lock, and a partitioned ticket lock configured with 16 grant values (or slots), such as the partitioned ticket lock described herein. As can be seen in the graph, many of these lock implementations allow reasonable scaling up to 16 threads. Beyond that, however, the performance of the simple ticket lock, for example, begins to fade. As illustrated in this example, the partitioned ticket lock may yield results fairly close to the much more restrictive list-based queuing lock and simple queue lock, making it competitive in many circumstances.

Figure 8:
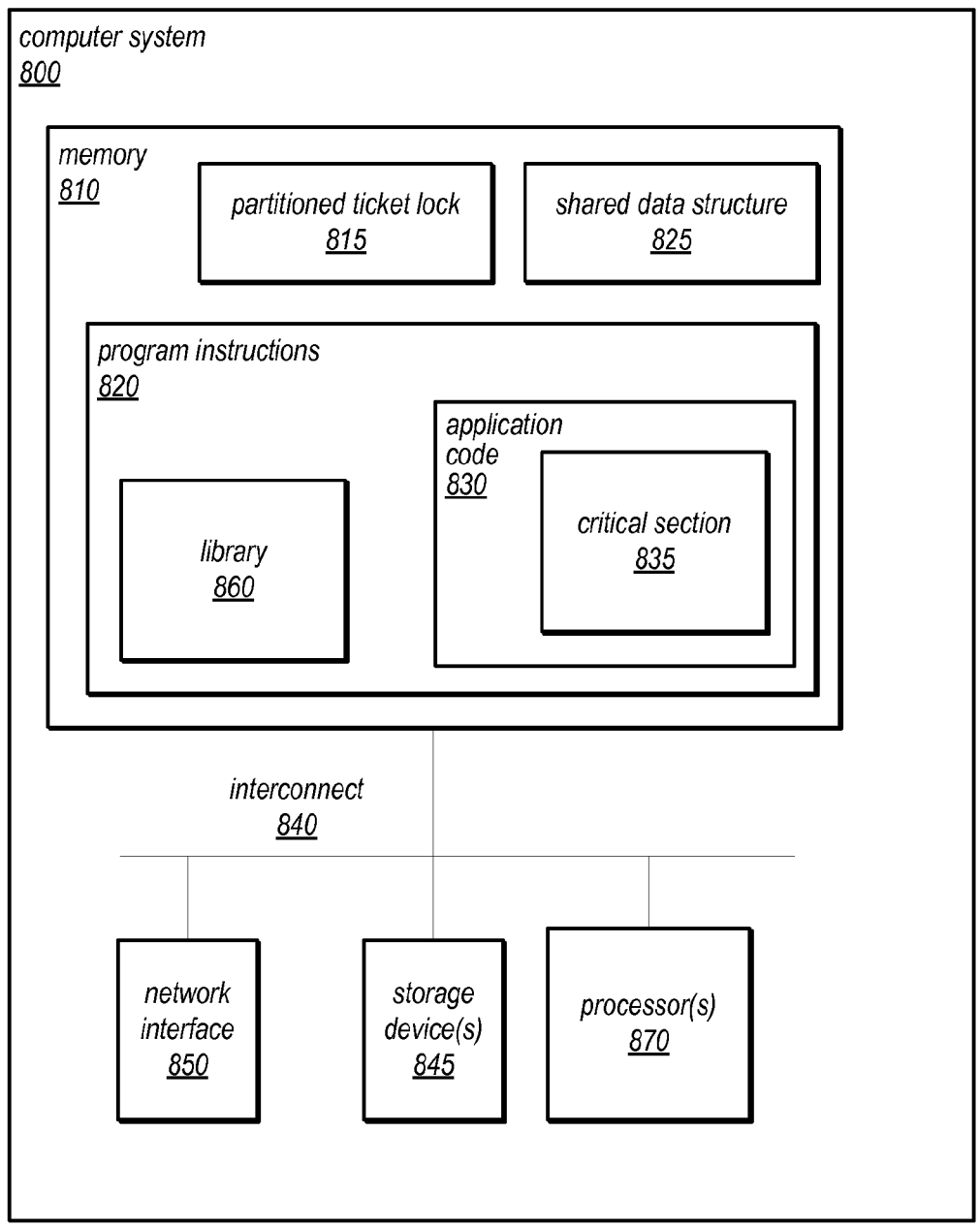
FIG. 8 is a block diagram illustrating one embodiment of a computer system configured to implement partitioned ticket locks, as described herein.

The techniques described herein for protecting a critical section or shared resource using a partitioned ticket lock (including those implemented as a composite ticket lock) may be implemented in any of a wide variety of computing systems. FIG. 8 illustrates a computing system that is configured to implement a partitioned ticket lock 815, as described herein and according to various embodiments. Computer system 800 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

In some embodiments, the methods described herein may be implemented by a computer program product, or software, that may include a non-transitory, computer-readable storage medium having stored thereon instructions, which may be used to program a computer system (or other electronic devices) to perform the techniques described herein. A computer-readable medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 800 may include a processor unit 870 (possibly including multiple processors, a single-threaded processor, a multi-threaded processor, a multi-core processor, etc.). The computer system 800 may also include one or more system memories 810 (e.g., one or more of cache, SRAM DRAM, RDRAM, EDO RAM, DDR RAM, SDRAM, Rambus RAM, EEPROM, etc.), a system interconnect 840 (e.g., LDT, PCI, ISA, etc.), a network interface 850 (e.g., an ATM interface, an Ethernet interface, a Frame Relay interface, etc.), and one or more storage device(s) 845 (e.g., optical storage, magnetic storage, etc.). The memory medium may include other types of memory as well, or combinations thereof. In other embodiments, computer system 800 may include more, fewer, or different components than those illustrated in FIG. 8 (e.g., video cards, audio cards, additional network interfaces, peripheral devices, etc.). The processor(s) 870, the storage device(s) 845, the network interface 850, and the system memory 810 may be coupled to the system interconnect 840.

One or more of the system memories 810 may include program instructions 820 configured to implement a partitioned ticket lock 815 (according to any of the embodiments described herein) that is configured to protect a critical section (such as critical section 835) or a shared resource (e.g., shared data structure 825). In some embodiments, one or more of the system memories 810 may include application code 830 (including critical code section 835, which may access a shared resource or shared data structure), as described herein. In some embodiments, program instructions 820 may also be configured to implement various functions in a library 860. For example, library 860 may provide various methods for creating, acquiring, modifying, and/or releasing a partitioned ticket lock or composite ticket lock, as described herein. In some embodiments, application code 830 may include calls to various methods provided by library 860 to create, acquire, modify, and/or release a partitioned ticket lock or composite ticket lock.

In various embodiments, library 860, application code 830, and/or critical section 835 may each be implemented in any of various programming languages or methods. For example, in one embodiment, library 860 and/or application code 830 may be JAVA based, while in another embodiment, they may be written using the C or C++ programming languages. Similarly, application code 830 may be written using Java, C, C++, or another programming language, according to various embodiments. Moreover, in some embodiments, library 860, application code 830, and/or critical section 835 may not be implemented using the same programming language. For example, application source code 830 may be C++ based, while library 860 may be developed using C.

As illustrated in FIG. 8, in some embodiments, memory 810 may include one or more shared storage locations that are accessible (e.g., during execution) by two or more threads, processors, or processes in computer system 800. For example, memory 810 may include a shared memory space in which one or more partitioned ticket locks 815 and/or shared resources (e.g., data structures 825) are instantiated, in different embodiments. In some embodiments, shared resources, latches, and/or other concurrent data structures that are protected by a partitioned ticket lock 815 may be maintained within memory 810, and may be accessed by a critical section 835.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
   performing, by a computer:
      initiating execution of a thread, wherein the thread is one of a plurality of executing threads that access a shared resource;
      the thread attempting to acquire a partitioned ticket lock that controls access to the shared resource, wherein the partitioned ticket lock comprises a single ticket value field and a plurality of grant value fields, wherein for at least one of the plurality of grant value fields two or more of the plurality of executing threads share a grant value field, wherein the number of executing threads sharing a grant value field is less than the maximum number of executing threads that could attempt to access the shared resource, and wherein said attempting comprises:
      obtaining a ticket value from the ticket value field;
      generating an identifier of a particular one of the plurality of grant value fields, wherein said generating is dependent on the obtained ticket value; and
      waiting for the value of the identified one of the plurality of grant value fields to indicate that the thread should be granted the partitioned ticket lock; and
   in response to determining that the value of the identified one of the plurality of grant value fields indicates that the thread should be granted the partitioned ticket lock, granting the partitioned ticket lock to the thread.

2. The method of claim 1,
   wherein said waiting comprises waiting for the value of the identified one of the plurality of grant value fields to be equal to the obtained ticket value; and
   wherein said determining comprises determining that the value of the identified one of the plurality of grant value fields is equal to the obtained ticket value.

3. The method of claim 1, wherein the plurality of grant value fields comprises a plurality of entries of an array of grant values, each entry corresponding to a different respective grant value field.

4. The method of claim 3, wherein the number of entries in the array is dynamically configurable at runtime.

5. The method of claim 3,
   wherein the number of entries in the array is fewer than the maximum number of executing threads that could attempt to access the shared resource; and
   wherein the method further comprises, while the thread is waiting for the value of the identified one of the plurality of grant value fields to be equal to the obtained ticket value, another thread waiting for the value of the identified one of the plurality of grant value fields to be equal to a different ticket value.

6. The method of claim 1, wherein each of the plurality of grant value fields is the sole occupant of a respective cache line.

7. The method of claim 1, wherein said obtaining a ticket value comprises performing a fetch-and-increment type operation to access the ticket value field.

8. The method of claim 1, wherein said generating an identifier comprises applying a mathematical or logical function to the obtained ticket value, and wherein the function applied to the obtained ticket value is dependent on the number grant value fields in the partitioned ticket lock.

9. The method of claim 1, further comprising releasing the partitioned ticket lock, wherein said releasing comprises:
   computing a new ticket value;
   generating an identifier of another one of the plurality of grant value fields, wherein said generating is dependent on the new ticket value; and
   storing the new ticket value in the other one of the plurality of grant value fields.

10. The method of claim 1, wherein each of the plurality of grant value fields comprises an event count or sequencer instance.

11. The method of claim 1,
   wherein the partitioned ticket lock is a composite lock comprising a plurality of sub-locks, wherein each grant value field comprises a respective sub-lock;

wherein said waiting comprises waiting for the identified one of the plurality of sub-locks to be in an unlocked state; and wherein said determining comprises determining that the identified one of the plurality of sub-locks is in an unlocked state.

12. A non-transitory, computer-readable storage medium, storing program instructions that when executed on one or more computers cause the one or more computers to perform:

initiating execution of a thread, wherein the thread is one of a plurality of executing threads that access a shared resource;

the thread attempting to acquire a partitioned ticket lock that controls access to the shared resource, wherein the partitioned ticket lock comprises a single ticket value field and a plurality of grant value fields, wherein for at least one of the plurality of grant value fields two or more of the plurality of executing threads share a grant value field, wherein the number of executing threads sharing a grant value field is less than the maximum number of executing threads that could attempt to access the shared resource, and wherein said attempting comprises:

obtaining a ticket value from the ticket value field;

generating an identifier of a particular one of the plurality of grant value fields, wherein said generating is dependent on the obtained ticket value; and waiting for the value of the identified one of the plurality of grant value fields to indicate that the thread should be granted the partitioned ticket lock; and in response to determining that the value of the identified one of the plurality of grant value fields indicates that the thread should be granted the partitioned ticket lock, granting the partitioned ticket lock to the thread.

13. The storage medium of claim 12, wherein said waiting comprises waiting for the value of the identified one of the plurality of grant value fields to be equal to the obtained ticket value; and wherein said determining comprises determining that the value of the identified one of the plurality of grant value fields is equal to the obtained ticket value.

14. The storage medium of claim 13, wherein the number grant value fields is fewer than the maximum number of executing threads that could attempt to access the shared resource; and wherein when executed on the one or more computers the program instructions further cause the one or more computers to perform, while the thread is waiting for the value of the identified one of the plurality of grant value fields to be equal to the obtained ticket value, another thread waiting for the value of the identified one of the plurality of grant value fields to be equal to a different ticket value.

15. The storage medium of claim 12, wherein said obtaining a ticket value comprises performing a fetch-and-increment type operation to access the ticket value field; and wherein said generating an identifier comprises applying a mathematical or logical function to the obtained ticket value, and wherein the function applied to the obtained ticket value is dependent on the number grant value fields in the partitioned ticket lock.

16. The storage medium of claim 12, wherein when executed on the one or more computers the program instructions further cause the one or more computers to perform releasing the partitioned ticket lock, wherein said releasing comprises:

computing a new ticket value;

generating an identifier of another one of the plurality of grant value fields, wherein said generating is dependent on the new ticket value; and storing the new ticket value in the other one of the plurality of grant value fields.

17. A system, comprising:

one or more processors; and memory coupled to the one or more processors, wherein the memory stores program instructions that when executed on the one or more processors cause the one or more processors to perform:

initiating execution of a thread, wherein the thread is one of a plurality of executing threads that access a shared resource;

the thread attempting to acquire a partitioned ticket lock that controls access to the shared resource, wherein the partitioned ticket lock comprises a single ticket value field and a plurality of grant value fields, wherein for at least one of the plurality of grant value fields two or more of the plurality of executing threads share a grant value field, wherein the number of executing threads sharing a grant value field is less than the maximum number of executing threads that could attempt to access the shared resource, and wherein said attempting comprises:

obtaining a ticket value from the ticket value field;

generating an identifier of a particular one of the plurality of grant value fields, wherein said generating is dependent on the obtained ticket value; and waiting for the value of the identified one of the plurality of grant value fields to indicate that the thread should be granted the partitioned ticket lock; and in response to determining that the value of the identified one of the plurality of grant value fields indicates that the thread should be granted the partitioned ticket lock, granting the partitioned ticket lock to the thread.

18. The system of claim 17, wherein said waiting comprises waiting for the value of the identified one of the plurality of grant value fields to be equal to the obtained ticket value; and wherein said determining comprises determining that the value of the identified one of the plurality of grant value fields is equal to the obtained ticket value.

19. The system of claim 18, wherein the number grant value fields is fewer than the maximum number of executing threads that could attempt to access the shared resource; and wherein when executed on the one or more processors the program instructions further cause the one or more processors to perform, while the thread is waiting for the value of the identified one of the plurality of grant value fields to be equal to the obtained ticket value, another thread waiting for the value of the identified one of the plurality of grant value fields to be equal to a different ticket value.

20. The system of claim 17, wherein when executed on the one or more processors the program instructions further cause the one or more processors to perform releasing the partitioned ticket lock, wherein said releasing comprises:

computing a new ticket value;

generating an identifier of another one of the plurality of grant value fields, wherein said generating is dependent on the new ticket value; and storing the new ticket value in the other one of the plurality of grant value fields.

* * * * *

UNITED STATES PATENT AND TRADEMARK OFFICE
CERTIFICATE OF CORRECTION

PATENT NO. : 9,158,596 B2  
APPLICATION NO. : 13/051877  
DATED : October 13, 2015  
INVENTOR(S) : Dice Page 1 of 1

It is certified that error appears in the above-identified patent and that said Letters Patent is hereby corrected as shown below:

On the title page, column 2, item [56] under other publications, line 19, delete "Commununications" and insert -- Communications --, therefor.

In the specification

Column 12, line 40, delete "underyling" and insert -- underlying --, therefor.

Signed and Sealed this  
Seventh Day of June, 2016

Michelle K. Lee  
*Director of the United States Patent and Trademark Office*